United States Patent
Shin et al.

(10) Patent No.: US 9,952,821 B2
(45) Date of Patent: Apr. 24, 2018

(54) SCREEN POSITION SENSING METHOD IN MULTI DISPLAY SYSTEM, CONTENT CONFIGURING METHOD, WATERMARK IMAGE GENERATING METHOD FOR SENSING SCREEN POSITION SERVER, AND DISPLAY TERMINAL

(71) Applicant: Electronics and Telecommunications Research Institute, Daejeon (KR)

(72) Inventors: Il Hong Shin, Daejeon (KR); Eun Jun Rhee, Daejeon (KR); Hyun Suk Roh, Daejeon (KR); Sung Hee Lee, Daejeon (KR); Hyun Woo Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 65 days.

(21) Appl. No.: 15/246,920

(22) Filed: Aug. 25, 2016

(65) Prior Publication Data

US 2017/0061628 A1     Mar. 2, 2017

(30) Foreign Application Priority Data

Sep. 1, 2015 (KR) .......................... 10-2015-0123715
Jun. 27, 2016 (KR) .......................... 10-2016-0079943

(51) Int. Cl.
*G06K 9/00* (2006.01)
*G06F 3/14* (2006.01)
(Continued)

(52) U.S. Cl.
CPC .......... *G06F 3/1423* (2013.01); *G06T 1/0021* (2013.01); *G06T 7/73* (2017.01);
(Continued)

(58) Field of Classification Search
CPC ................. G06F 3/1423; G06T 1/0021; G06T 2207/10004; G06T 7/73; G09G 2356/00;
(Continued)

(56) References Cited

U.S. PATENT DOCUMENTS 8,977,047 B2 *  3/2015  Wolk ................... G06K 9/4652
                                                              382/165
2003/0174858 A1  9/2003  Kim et al.
(Continued)

FOREIGN PATENT DOCUMENTS

KR    10-0776663 B1    11/2007
KR    10-2014-0067343 A    6/2014

*Primary Examiner* — Bhavesh Mehta
*Assistant Examiner* — Ian Lemieux
(74) *Attorney, Agent, or Firm* — NSIP Law

(57) ABSTRACT

A screen position sensing method in a multi display system, a content configuring method, a watermark image generating method for sensing a screen position, a server, and a display terminal are provided. A screen position sensing method in a multi display system performed by a sensing server may include receiving identification information of display terminals from a display server, receiving an image output by each of the display terminals from a camera, and determining a screen position of each of the display terminals based on a watermark included in the image of the display terminals and the received identification information.

19 Claims, 6 Drawing Sheets

(51) Int. Cl.
  *H04N 5/232* (2006.01)
  *G06T 1/00* (2006.01)
  *G06T 7/73* (2017.01)
(52) U.S. Cl.
  CPC ......... *H04N 5/232* (2013.01); *H04N 5/23254* (2013.01); *G06T 2207/10004* (2013.01); *G09G 2356/00* (2013.01); *G09G 2360/147* (2013.01)
(58) Field of Classification Search
  CPC ............. G09G 2360/147; H04N 5/232; H04N 5/23254
  See application file for complete search history.

(56) References Cited

U.S. PATENT DOCUMENTS

| | | | |
|---|---|---|---|
| 2009/0002480 A1* | 1/2009 | Cutler | H04N 7/147 348/14.08 |
| 2009/0172404 A1 | 7/2009 | Kim et al. | |
| 2010/0228632 A1* | 9/2010 | Rodriguez | G06F 3/011 705/14.66 |
| 2011/0280436 A1 | 11/2011 | Kalker et al. | |
| 2012/0140978 A1* | 6/2012 | Kim | H04N 21/4318 382/100 |
| 2012/0275642 A1* | 11/2012 | Aller | H04M 1/72522 382/100 |
| 2014/0016817 A1* | 1/2014 | Nakagata | H04N 19/467 382/100 |
| 2014/0062874 A1* | 3/2014 | Suggs | G06F 3/0325 345/158 |
| 2014/0348379 A1* | 11/2014 | Kraegeloh | G06K 9/6215 382/103 |
| 2015/0138038 A1* | 5/2015 | Nam | G06F 3/1446 345/1.3 |
| 2015/0319403 A1* | 11/2015 | Antipa | H04M 1/72561 386/224 |
| 2016/0180810 A1* | 6/2016 | Maeda | H04B 10/116 345/589 |
| 2017/0262247 A1* | 9/2017 | Yoganandan | G06F 3/0482 |
| 2017/0323543 A1* | 11/2017 | Glaser | G08B 13/19673 |

* cited by examiner

FIG. 6
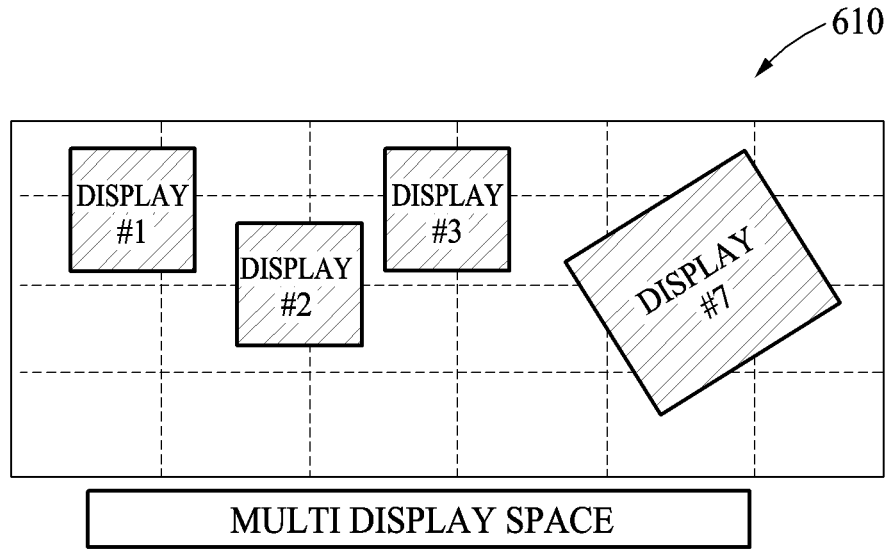
MULTI DISPLAY SPACE
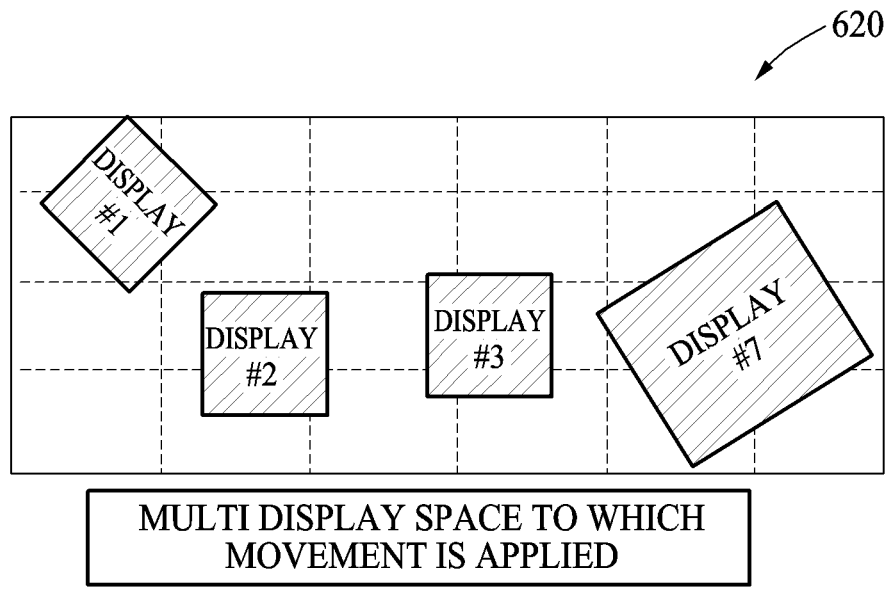
MULTI DISPLAY SPACE TO WHICH MOVEMENT IS APPLIED

SCREEN POSITION SENSING METHOD IN MULTI DISPLAY SYSTEM, CONTENT CONFIGURING METHOD, WATERMARK IMAGE GENERATING METHOD FOR SENSING SCREEN POSITION SERVER, AND DISPLAY TERMINAL

CROSS-REFERENCE TO RELATED APPLICATION(S)

This application claims the priority benefit of Korean Patent Application No. 10-2015-0123715 filed on Sep. 1, 2015, in the Korean Intellectual Property Office, and Korean Patent Application No. 10-2016-0079943 filed on Jun. 27, 2016, in the Korean Intellectual Property Office, the disclosure of which is incorporated herein by reference for all purposes.

BACKGROUND

1. Field

One or more example embodiments relate to a screen position sensing method in a multi display system performed by a sensing server, a content configuring method in a multi display system performed by a display server, a watermark generating method for sensing a screen position in a multi display system performed by a display terminal, and the display terminal.

2. Description of Related Art

A multi display system has been utilized for exhibition and artistic representation. A multi display system may be used in, for example, digital signage or other type of electronic board.

A multi display system may be used as an effective alternative when it is difficult to manufacture a large display. Recently, multi display systems have been provided which use a method of two-dimensionally dividing an entire screen of content based on an area of each display, and may use content exclusively for special visual effects.

SUMMARY

An aspect of the present invention is to transmit and display unique information of each display using a digital watermark technique in order to obtain physical information of the display.

Another aspect also provides space information of each display by sensing unique information of each display using a camera based on a digital watermark technique.

According to an aspect, there is provided a screen position sensing method in a multi display system performed by a sensing server, the method including receiving identification information of display terminals from a display server, receiving an image output by each of the display terminals from a camera, and determining a screen position of each of the display terminals based on a watermark included in the image of the display terminals and the received identification information.

The display server may be configured to generate the identification information of each of the display terminals and transmit the generated identification information to the sensing server and the display terminals corresponding to the generated identification information, and each of the display terminals is configured to receive the identification information from the display server and generate the watermark based on the received identification information. The method may further include transmitting the determined screen position to the display server, wherein the display server is configured to transmit content configuration information to the display terminals based on the screen position of each of the display terminals received from the sensing server.

The transmitting may include transmitting identification information of the display terminals and a position of each of the display terminals in an entire display space.

The receiving may include receiving, in real time, an image obtained by photographing the image output by each of the display terminals from the camera.

The determining may include performing reversible watermarking on the image obtained by photographing the image output by each of the display terminals.

The determining may include extracting the watermark based on a performance of the reversible watermarking.

The determining may include determining the screen position of each of the display terminals based on a color of the watermark.

The determining may include adjusting a noise based on the color of the watermark.

The method may further include generating models of the display terminals, wherein the determining may include determining the screen position of each of the display terminals based on the generated models of the display terminals.

According to another aspect, there is provided a content configuring method in a multi display system performed by a display server, the method including generating identification information of display terminals, transmitting the identification information to a sensing server and the display terminals, receiving information on a screen position of each of the display terminals from the sensing server, generating content configuration information on content to be output by the display terminals based on the screen position of each of the display terminals, and transmitting the content configuration information to the display terminals, wherein each of the display terminals is configured to generate a watermark based on the identification information and output an image in which the watermark is embedded, and the sensing server is configured to determine the screen position of each of the display terminals based on the identification information and the watermark embedded in the image output by each of the display terminals.

The method may further include receiving the determined screen position from the sensing server, generating the content configuration information based on the received screen position, and transmitting the generated content configuration information to the display terminals.

The generating may include receiving information on whether each of the display terminals is positioned in an entire display space from each of the display terminals when each of the display terminals is connected to the display server, and generating the identification information of the display terminals based on the information on whether each of the display terminals is positioned in the entire display space.

The receiving may include receiving rotation information and size information of each of the display terminals.

The transmitting of the content configuration information may include transmitting information that controls a screen of each of the display terminals based on the rotation information of each of the display terminals.

According to still another aspect, there is provided a watermark image generating method for sensing a screen position in a multi display system performed by a display terminal, the method including receiving identification information of a display terminal from a display server, and generating a watermark based on the received identification information and outputting an image in which the watermark is embedded, wherein a sensing server is configured to determine a screen position of each of display terminals based on the watermark embedded in the image output by each of the display terminals and the identification information received from the display server.

The method may further include receiving content configuration information generated based on the screen position from the display server, wherein the display server is configured to generate the content configuration information based on the screen position received from the sensing server.

The method may further include outputting content on a screen based on the received content configuration information.

The outputting may include outputting, on a screen, a watermark in a color corresponding to the received identification information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 6 is a diagram illustrating an entire display space according to an example embodiment.

DETAILED DESCRIPTION

Figure 1:
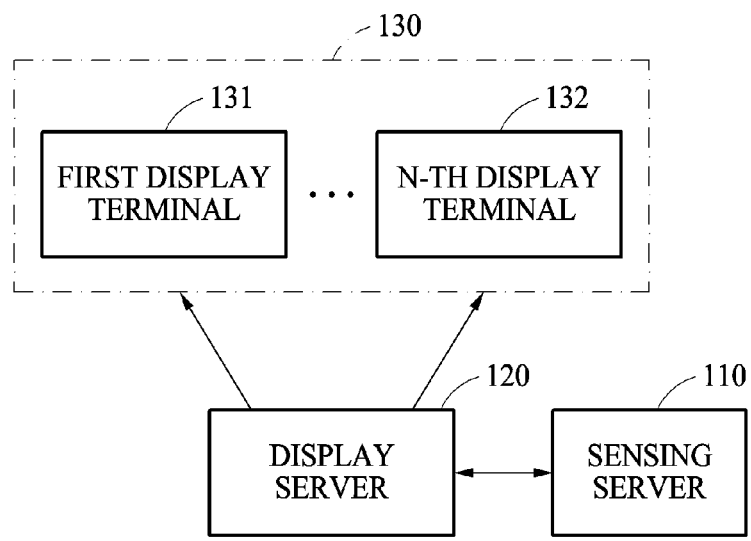
FIG. 1 is a diagram illustrating a screen position sensing method in a multi display system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular exemplary embodiments disclosed. On the contrary, exemplary embodiments are to cover all modifications, equivalents, and alternatives falling within the scope of the exemplary embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various exemplary embodiments will now be described more fully with reference to the accompanying drawings in which some exemplary embodiments are shown. In the drawings, the thicknesses of layers and regions are exaggerated for clarity.

FIG. 1 is a diagram illustrating a screen position sensing method in a multi display system according to an example embodiment.

Referring to FIG. 1, an entire system includes a sensing server 110, a display server 120, and display terminals 130. As a multi display, the display terminals 130 may include a first display terminal 131 to an n-th display terminal 132. The sensing server 110, the display server 120, and the display terminals 130 may be computing devices including at least one of a memory, a processor, or a data transceiver, but the sensing server 110, the display server 120, and the display terminals 130 are not limited thereto. The display terminals 130 may be display devices, for example, light emitting diode (LED) monitors.

Each of the display terminals 130 may display identification information using a watermark, the sensing server 110 may extract watermark configuration information using a camera, and the display server 120 may combine pieces of space information of each of the display terminals 130. Hereinafter, information, for example, space information, identification information, position information, and rotation information, of display terminals also refers to information of each of the display terminals.

The display server 120 may generate information on the watermark to generate the space information of the display terminals 130 using the watermark. In this example, the information on the watermark may include a color of the watermark corresponding to the identification information of the display terminals 130. The display terminals 130 may receive the information on the watermark generated by the display server 120, generate the watermark, and combine the generated watermark and information on a screen to be output. In this example, the information on the screen may be information on, for example, an image and a video to be output to the screen.

The sensing server 110 may extract configuration information of the display terminals 130 by performing reversible watermarking using the camera. The sensing server 110 may receive, from the camera, an image obtained by photographing the display terminals 130 or a multi display system by the camera. When the sensing server 110 is the computing device such as a notebook, the sensing server 110 may include the camera. The sensing server 110 may extract reversible watermark information by performing the reversible watermarking on the photographed image. The sensing server 110 may extract an orientation of each of the display terminals 130. The sensing server 110 may extract the space information of the display terminals 130, for example, a position of each of the display terminals 130. The sensing server 110 may transmit the extracted space information.

The display server 120 may generate a color of a watermark that differently corresponds to a unique identification (ID), as the identification information, of the display terminals 130. The display server 120 may transmit the generated identification information of the different display terminals 130 or the color of the watermark to each of the display terminals 130.

According to the color of the watermark or the received identification information of the display terminals 130, the display terminals 130 may generate the watermark based on the information on the screen of each of the display terminals 130. The display terminals 130 may display the watermark by combining the watermark and an image to be output, and then outputting the watermark with the image to the screen. In this example, the information on the screen of each of the display terminals 130 may include a size of a screen, a resolution, and a position at which an image is output to the screen.

Figure 2:
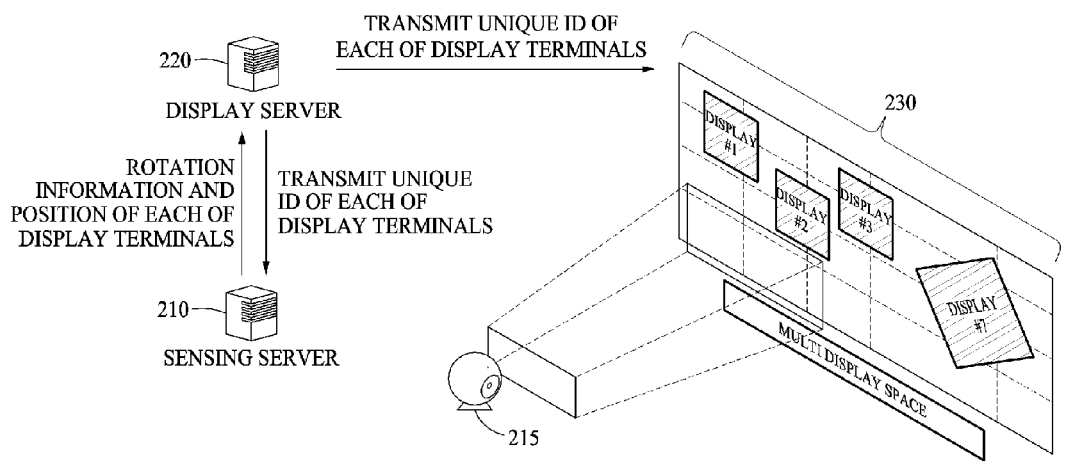
FIG. 2 is a diagram illustrating a screen position sensing method in a multi display system using a camera according to an example embodiment.

FIG. 2 is a diagram illustrating a screen position sensing method in a multi display system using a camera according to an example embodiment.

Referring to FIG. 2, a sensing server 210 senses physical information of display terminals 230 of a multi display system using a camera 215. When the display terminals 230 are positioned in an entire display space, the display terminals 230 may transmit a message indicating that the display terminals 230 are currently positioned in the entire display space corresponding to a multi display space through communication with a display server 220.

The display server 220 may generate or store a unique identification (ID) of each of the display terminals 230 as identification information of the display terminals 230. The display server 220 may transmit, to each of the display terminals 230, the unique ID of each of the display terminals 230 as the identification information of the display terminals 230. The display server 220 may transmit, to the sensing server 210, the unique ID of each of the display terminals 230 as the identification information of the display terminals 230.

Each of the display terminals 230 may generate and configure a watermark based on the unique ID of each of the display terminals 230 and may embed the watermark in an image that is currently output and displayed. The camera 215 may transmit, to the sensing server 210, information on an image obtained by photographing, in real time, an entire display space corresponding to a multi display space. The information on the photographed image may be a photographed image.

The sensing server 210 may verify the ID of each of the display terminals 230 from an image extracted by performing reversible watermarking on the currently photographed image, and determine information on an area of each of the display terminals 230, for example, a screen size, a screen position, and rotation information of the display terminals 230. The sensing server 210 may determine a position of each of the display terminals 230 in the entire display space corresponding to the multi display space, and then transmit the position of each of the display terminals 230 to the display server 220. The display server 220 may effectively generate or modify content configuration information on content to be output to the display terminals 230 by utilizing various methods that display the content based on information on the position of each of the display terminals 230, and transmit the generated or modified content configuration information to the display terminals 230.

Figure 3:
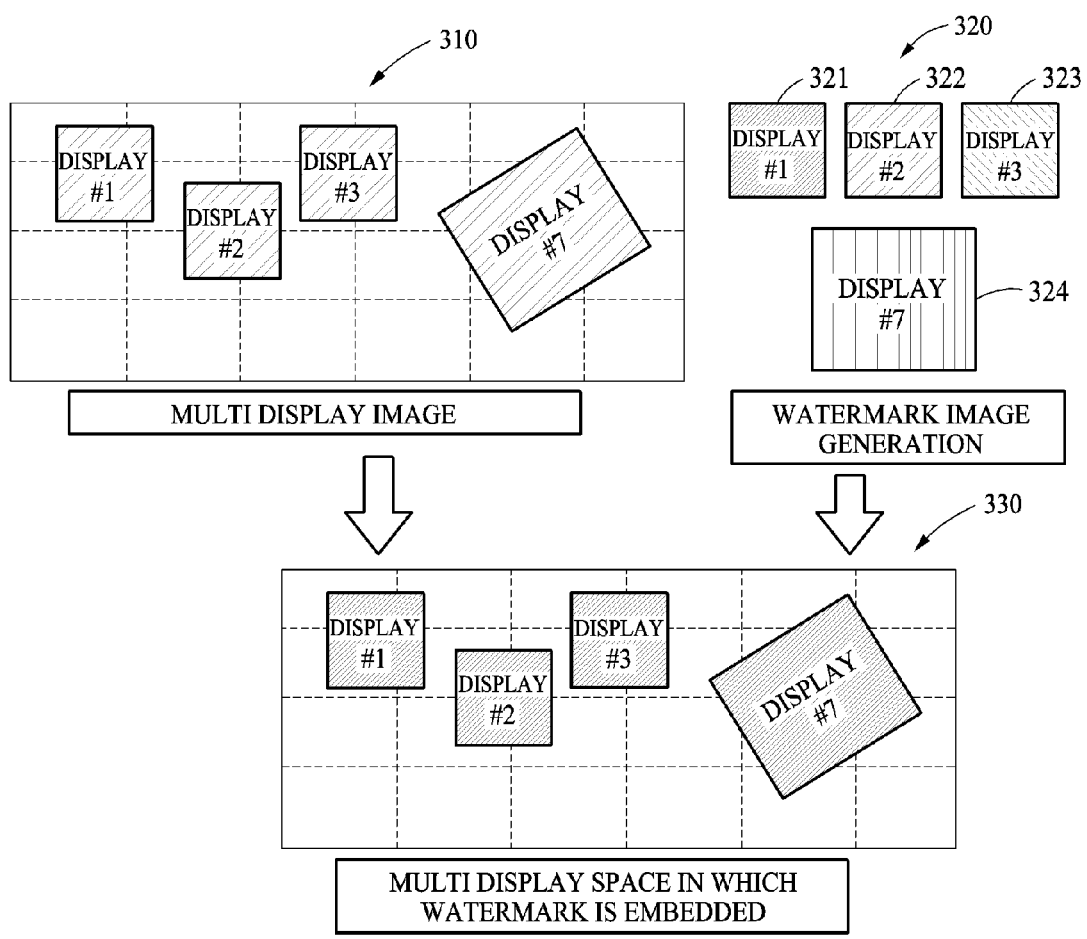
FIG. 3 is a diagram illustrating a method in which a display terminal generates and embeds a watermark according to an example embodiment.

FIG. 3 is a diagram illustrating a method in which a display terminal generates and embeds a watermark according to an example embodiment.

Referring to FIG. 3, a watermark is generated and embedded in each of display terminals. Each of the display terminals may receive an identification (ID) of each of the display terminals transmitted by a display server and generate a watermark corresponding to the received ID of each of the display terminals. For example, watermarks may be differentiated based on a color, for example, red, yellow, green, or blue.

When the ID of a first display is "1", a red watermark 321 corresponding to "1" is generated. When the ID of a second display is "2", a yellow-green watermark 322 corresponding to "2" is generated. When the ID of a third display is "3", a blue-green watermark 323 corresponding to "3" is generated. When the ID of a fourth display is "7", a blue watermark 324 corresponding to "7" is generated.

A predetermined watermark image may be generated. However, a color may be generated based on the ID for detecting forgery. For example, when the ID is "4", a watermark in a color of which a red-green-blue (RGB) value is (127, 60, 235) may be generated. Here, any one of various colors can be set to correspond to the ID.

The display terminals may embed an image 310 to be displayed and a watermark image 320 in a current image based on a watermark embedding method. The display terminals may output and display an image 330 in which the watermark is embedded. For example, a simple method of embedding a color in a least significant bit (LSB) may be used. Because a viewer is unaware whether the watermark is embedded, the viewer may view current content as usual.

A method of encoding information, for example, steganography, may be used. For example, each of the display terminals may output information corresponding to the ID of each of the display terminals based on the steganography instead of watermarking, such that a user is unaware of the output.

Figure 4:
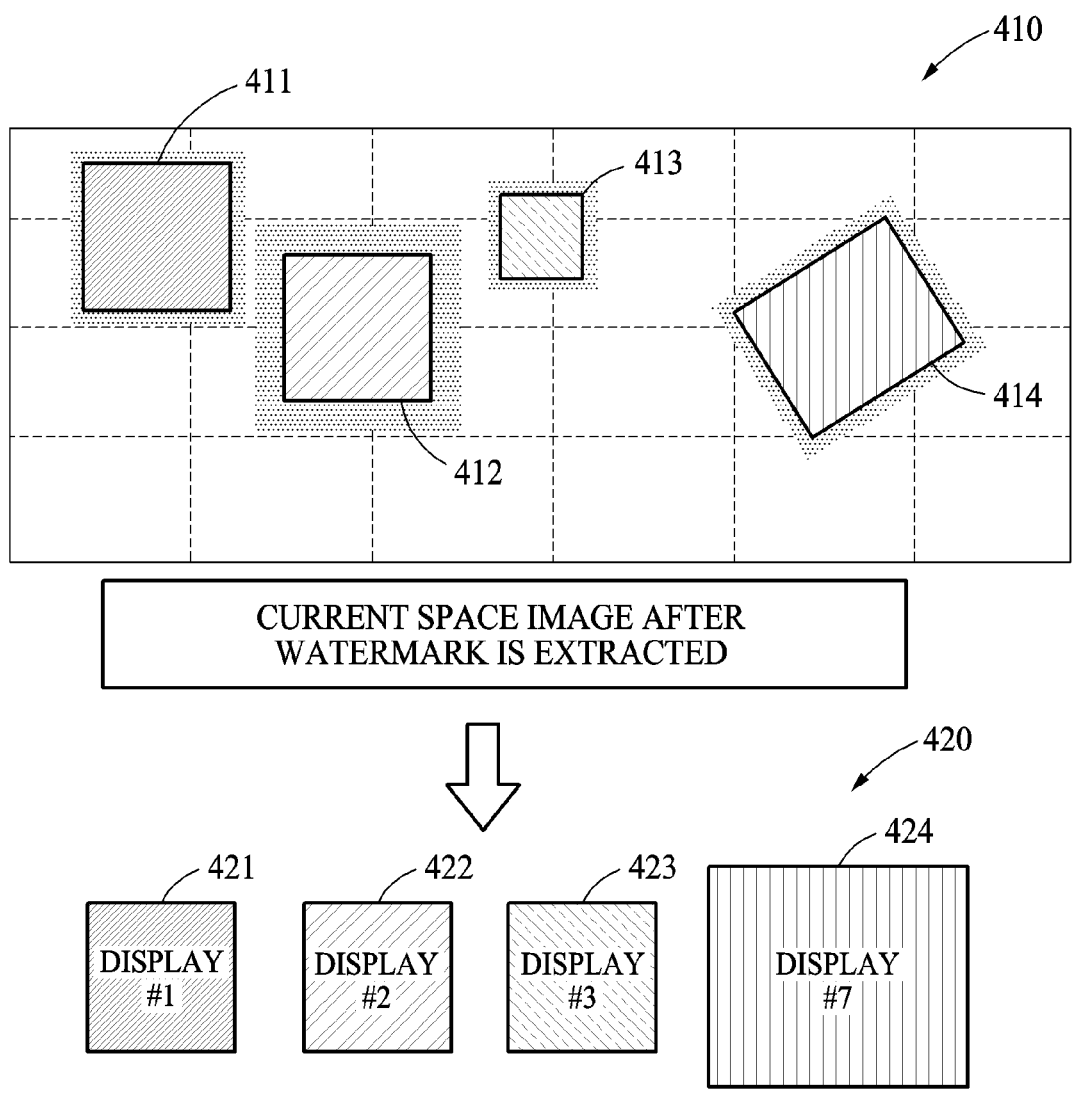
FIG. 4 is a diagram illustrating a method in which a sensing server extracts a watermark according to an example embodiment.

FIG. 4 is a diagram illustrating a method in which a sensing server extracts a watermark according to an example embodiment.

Referring to FIG. 4, a watermark is extracted. A sensing server may convert a current image obtained by a camera to a watermark space image 410 based on a reversible watermarking technique. In this example, a first watermark area 411 corresponding to a first display may be red, and a second watermark area 412 corresponding to a second display may be yellow-green. A third watermark area 413 corresponding to a third display may be blue-green, and a fourth watermark area 414 corresponding to a fourth display may be blue.

Because an image obtained by the camera is an image from an actual camera, various types of noise may be present in the image. The sensing server may share, with a display server, information on a color generated based on an identification (ID) and a number of watermarks identical to a number of the display terminals. The sensing server may effectively adjust a noise based on information shared with the display server. For example, the sensing server may obtain and generate a sufficient reversible watermark image based on a thresholding method.

Because information on a size of an actual monitor is not included in the sensing server, a refinement process may be performed based on an image obtained based on the thresholding method. In this example, the image may have a color of an area assigned to correspond to an ID of each of the display terminals. The sensing server may extract watermarks 420 by performing the refinement process. A first watermark 421 corresponding to the first display is red, and a second watermark 422 corresponding to the second display may be yellow-green. A third watermark 423 corresponding to the third display may be blue-green, and a fourth watermark 424 corresponding to the fourth display may be blue.

Figure 5:
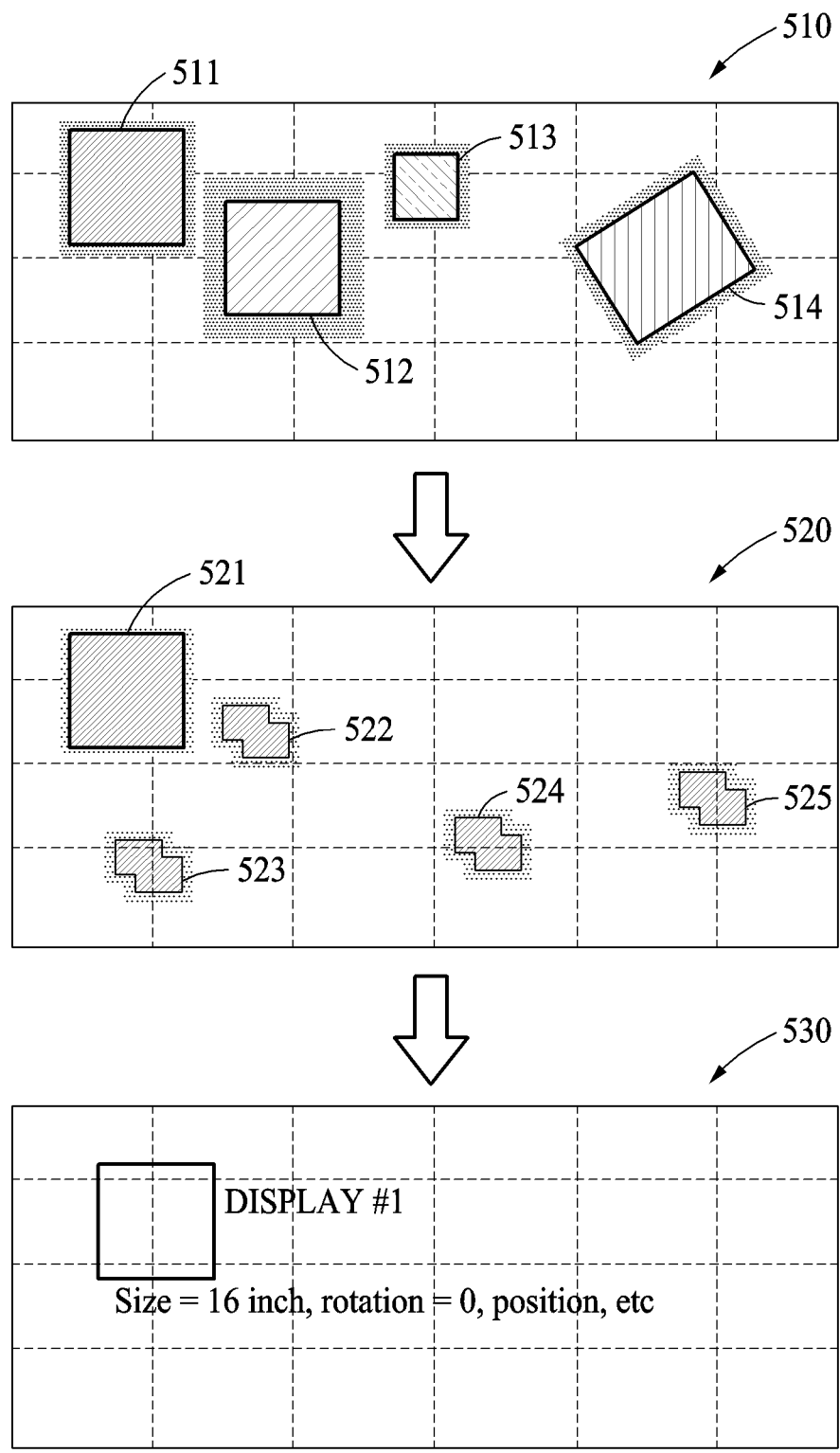
FIG. 5 is a diagram illustrating a screen position sensing method in a multi display system performed by a sensing server according to an example embodiment.

FIG. 5 is a diagram illustrating a screen position sensing method in a multi display system performed by a sensing server according to an example embodiment.

Referring to FIG. 5, a watermark refinement process is performed. A first watermark area 511 corresponding to a first display may be red, and a second watermark area 512 corresponding to a second display may be yellow-green. A third watermark area 513 corresponding to a third display may be blue-green, and a fourth watermark area 514 corresponding to a fourth display may be blue. In this example, identifications (IDs) of the first display, the second display, the third display, and the fourth display may be "1", "2", "3", and "7", respectively.

The sensing server may obtain and generate an image 520 on which a thresholding process is performed from a watermark space image 510 in a current image based on color information assigned to the ID of each of the display terminals. Like in the thresholded image 520, a noise may exist in an actually obtained or generated image. A first watermark area 521 corresponding to the first display may be red. Also, a first noise area 522, a second noise area 523, a third noise area 524, and a fourth noise area 525 may be also red.

The sensing server may set a model of the display terminal or a model of a screen of the display terminal. For example, when the display terminal is a rectangular monitor, the model may be generated as having two parameters based on a size of the display terminal and a degree of rotation of the display terminal. The size of the display terminal may be 16 inches or 24 inches, and the degree of rotation of the display terminal may be 30 degrees or 56 degrees.

The sensing server may extract an optimal model parameter 530 by matching the set model with the current image. For example, as a model matching method, an active appearance model (AAM) or a scale-invariant feature transform (SIFT) that extracts an invariant feature such as a brightness value may be used. The sensing server may obtain size information, position information, and rotation information on a space of each of the display terminals corresponding to an ID of a current display terminal among the display terminals based on the model matching method. In this example, the model may be a rectangular model. The sensing server may configure a multi display space by performing a refinement process on IDs of the display terminals. For example, a size of the space corresponding to the ID 1 of the first display may be 16 inches. A degree of rotation may be 0, and a position may be indicated by (x, y) coordinates, for example, (5, 4).

FIG. 6 is a diagram illustrating an entire display space according to an example embodiment.

Referring to FIG. 6, a display terminal is moved. The display terminal may be moved without changing currently displayed content. A sensing server may extract and obtain new position information and rotation information of display terminals based on a watermarking technique and may transmit the obtained position information and rotation information to a display server. A viewer may continuously view a display terminal or all display terminals regardless of sensing, that is, the viewer is unaware of the sensing performed by the sensing server. The sensing server may continuously track a change of a space configuration regardless of whether the current content is displayed based on the change of the space configuration. The sensing server may determine and recognize a position of a screen of each of the display terminals in an entire display space 610 corresponding to a multi display space using an image obtained by a camera. Also, the sensing server may continuously determine and recognize a rotation and the position of the screen of each of the display terminals in an entire display space 620 changed due to a movement of each of the display terminals continuously using the image obtained from the camera.

When each of the display terminals continuously rotates in a circle, the sensing server may recognize the rotation of each of the display terminals and transmit the recognized rotation information to the display server. The display server may transmit, to the display terminals, an instruction that each of the display terminals outputs a rotating image by allowing a viewer to view the rotating image based on the received rotation information. Depending on circumstances, the display server may perform transcoding on the content to be transmitted to the display terminals.

Figure 7:
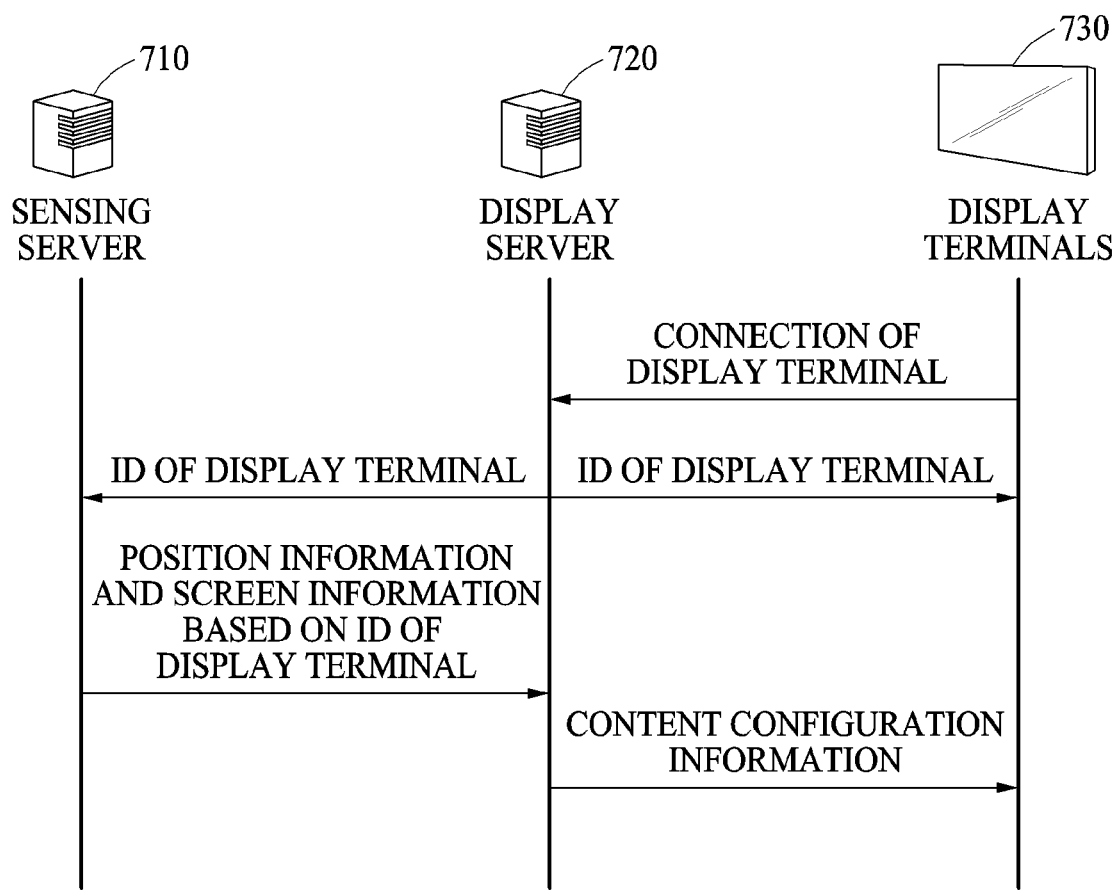
FIG. 7 is a flowchart illustrating a screen position sensing method in a multi display system according to an example embodiment.

FIG. 7 is a flowchart illustrating a screen position sensing method in a multi display system according to an example embodiment.

A flow of operations of a sensing server 710, a display server 720, and display terminals 730 is described with reference to FIG. 7. The display terminals 730 corresponding to a multi display group may be connected to the display server 720, and an identification (ID) may be allocated to each of the display terminals 730. The display server 720 may transmit the generated ID to each of the corresponding display terminals 730.

The display terminals 730 may generate and configure a watermark using an image information generating method determined based on the ID of each of the display terminals 730. The display terminals 730 may output the watermark by embedding the watermark in a currently displayed image. A camera may photograph the display terminals 730, such that the image including the watermark may be received in a multi display space.

The sensing server 710 may receive the image photographed by the camera as an input. The sensing server 710 may obtain and recognize size information and position information of the display terminals 730 based on a model matching method by performing reversible watermarking on the photographed image received according to the ID of each of the display terminals 730 transmitted by the display server 720. Subsequently, the sensing server 710 may transmit the obtained and recognized size information and the position information to the display server 720. Here, recognized information may be position information and rotation information of the display terminals 730. The display server 720 may construct a flow of content displayed in the display terminals 730 and an entire display space by reconstructing the content based on the transmitted physical position information. The display server 720 may transmit content configuration information to the display terminals 730. In this example, the content configuration information may be content of which a position or a rotation angle is changed based on a screen position and a screen rotation angle or a content control instruction on the position or the rotation angle based on the screen position and the screen rotation angle. However, the content configuration information is not limited thereto.

According to embodiments of the present invention, it is possible to verify an ID of a display by sensing, in real-time, physical position information of a multi display using a watermark and a camera and enhance utilization of the multi display by three-dimensionally constructing spatial coordinate information.

According to embodiments of the present invention, it is possible to change an arrangement and a configuration of a display during a service because a wired and wireless connection between displays is not required in a multi display system and a user viewing the multi display is unaware of an ID of each of the displays using a watermark technique.

According to embodiments of the present invention, it is possible to sense, using a camera, position information in order to use the position information in a space, and a level of the position information is higher than that of configuration information of a monitor.

According to embodiments of the present invention, it is possible to be adaptive in real-time even when a multi display system is dynamically changed, and transmit information such that content is automatically extended or reduced based on a position and a rotation, and process, in real-time, a new configuration of a multi display based on a three-dimensional (3D) space configuration or a rotation of the multi display.

According to embodiments of the present invention, it is possible to activate new spatial perceptual content generation to be effectively applied in exhibition, advertisement, and information transmission.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A screen position sensing method in a multi display system performed by a sensing server, the method comprising:
receiving identification information of display terminals from a display server;
receiving an image output by each of the display terminals from a camera; and determining a screen position of each of the display terminals based on a watermark included in the image of the display terminals and the received identification information.

2. The method of claim 1, wherein the display server is configured to generate the identification information of each of the display terminals and transmit the generated identification information to the sensing server and the display terminals corresponding to the generated identification information, and each of the display terminals is configured to receive the identification information from the display server and generate the watermark based on the received identification information.

3. The method of claim 1, further comprising:
transmitting the determined screen position to the display server,
wherein the display server is configured to transmit content configuration information to the display terminals based on the screen position of each of the display terminals received from the sensing server.

4. The method of claim 3, wherein the transmitting comprises transmitting identification information of the display terminals and a position of each of the display terminals in an entire display space.

5. The method of claim 1, wherein the receiving comprises receiving, in real time, an image obtained by photographing the image output by each of the display terminals from the camera.

6. The method of claim 5, wherein the determining comprises performing reversible watermarking on the image obtained by photographing the image output by each of the display terminals.

7. The method of claim 6, wherein the determining comprises extracting the watermark based on a performance of the reversible watermarking.

8. The method of claim 1, wherein the determining comprises determining the screen position of each of the display terminals based on a color of the watermark.

9. The method of claim 8, wherein the determining comprises adjusting a noise based on the color of the watermark.

10. The method of claim 1, further comprising:
generating models of the display terminals,
wherein the determining comprises determining the screen position of each of the display terminals based on the generated models of the display terminals.

11. A content configuring method in a multi display system performed by a display server, the method comprising:
generating identification information of display terminals;
transmitting the identification information to a sensing server and the display terminals;
receiving information on a screen position of each of the display terminals from the sensing server;
generating content configuration information on content to be output by the display terminals based on the screen position of each of the display terminals; and
transmitting the content configuration information to the display terminals,
wherein each of the display terminals is configured to generate a watermark based on the identification information and output an image in which the watermark is embedded, and the sensing server is configured to determine the screen position of each of the display terminals based on the identification information and the watermark embedded in the image output by each of the display terminals.

12. The method of claim 11, further comprising:
receiving the determined screen position from the sensing server;
generating the content configuration information based on the received screen position; and
transmitting the generated content configuration information to the display terminals.

13. The method of claim 11, wherein the generating comprises:
receiving information on whether each of the display terminals is positioned in an entire display space from each of the display terminals when each of the display terminals is connected to the display server; and
generating the identification information of the display terminals based on the information on whether each of the display terminals is positioned in the entire display space.

14. The method of claim 12, wherein the receiving comprises receiving rotation information and size information of each of the display terminals.

15. The method of claim 12, wherein the transmitting of the content configuration information comprises transmitting information that controls a screen of each of the display terminals based on the rotation information of each of the display terminals.

16. A watermark image generating method for sensing a screen position in a multi display system performed by a display terminal, the method comprising:
receiving identification information of a display terminal from a display server; and
generating a watermark based on the received identification information and outputting an image in which the watermark is embedded,
wherein a sensing server is configured to determine a screen position of each of display terminals based on the watermark embedded in the image output by each of the display terminals and the identification information received from the display server.

17. The method of claim 16, further comprising:
receiving content configuration information generated based on the screen position from the display server,
wherein the display server is configured to generate the content configuration information based on the screen position received from the sensing server.

18. The method of claim 17, further comprising:
outputting content on a screen based on the received content configuration information.

19. The method of claim 16, wherein the outputting comprises outputting, on a screen, a watermark in a color corresponding to the received identification information.

* * * * *